United States Patent
Zietek et al.

(10) Patent No.: US 6,555,195 B1
(45) Date of Patent: Apr. 29, 2003

(54) SHAPING TOOL FOR INFORMATION CARRIER DISC BLANKS

(75) Inventors: Michael Zietek, Ober-Ramstadt (DE); Harry Schwarz, Gueterslon (DE); Klaus Albrecht, Mainz-Hechtsheim (DE); Rudolf Blass, Darmstadt (DE); Werner Hoess, Heusenstamm (DE); Hans-Juergen Kress, Bruehl (DE); Michael Wicker, Seeheim-Jugenheim (DE)

(73) Assignee: Roehm GmbH & Co. KG, Darmstadt (DE)

( * ) Notice: Subject to any disclaimer, the term of this patent is extended or adjusted under 35 U.S.C. 154(b) by 0 days.

(21) Appl. No.: 09/805,777

(22) PCT Filed: Sep. 15, 1999

(86) PCT No.: PCT/EP99/06822
§ 371 (c)(1),
(2), (4) Date: Mar. 19, 2001

(87) PCT Pub. No.: WO00/16957
PCT Pub. Date: Mar. 30, 2000

(30) Foreign Application Priority Data

Sep. 18, 1998 (DE) ......................... 198 42 899
Nov. 27, 1998 (DE) ......................... 198 54 736

(51) Int. Cl.$^7$ ............................................. B32B 3/02
(52) U.S. Cl. ....................... 428/64.1; 264/319
(58) Field of Search ....................... 428/64.1, 64.4, 428/913; 264/299, 319, 328.12

(56) References Cited

U.S. PATENT DOCUMENTS

| | | | |
|---|---|---|---|
| 5,330,693 A | * 7/1994 | Takada | .................. 264/106 |
| 5,548,033 A | 8/1996 | Vetter et al. | |
| 5,705,189 A | 1/1998 | Lehmann et al. | |
| 5,837,780 A | 11/1998 | Albrecht et al. | |
| 6,040,387 A | 3/2000 | Albrecht et al. | |
| 6,287,470 B1 | 9/2001 | Vetter et al. | |
| RE37,719 E | * 5/2002 | Sugiyama | .................. 428/64.3 |

OTHER PUBLICATIONS

U.S. patent application Ser. No. 10/029,265, filed Dec. 28, 2001, pending.
U.S. patent application Ser. No. 09/913,720, filed Aug. 31, 2001, pending.
U.S. patent application Ser. No. 09/889,565, filed Jul. 30, 2001, pending.
U.S. patent application Ser. No. 09/868,644, filed Jun. 28, 2001, pending.
U.S. patent application Ser. No. 09/805,777, filed Mar. 19, 2001, pending.

* cited by examiner

Primary Examiner—Elizabeth Mulvaney
(74) Attorney, Agent, or Firm—Oblon, Spivak, McClelland, Maier & Neustadt, P.C.

(57) ABSTRACT

The invention relates to a shaping tool for the injection molding or injection compression of information carrier disc blanks (11) made of polymethacrylate plastic which is suited as a component of an injection molding or injection compression machine. The shaping tool is comprised of two mold parts (1, 2), whereby one mold part (1) contains a bottom part (8) of a mold with the information data and, together with the second mold part (2), forms a cavity for the one information carrier blank and one sprue bush (4) for a sprue piece (5) in the tool having a concentrically positioned feed orifice (6). In addition, the tool comprises a impact cylinder (9) for shearing the sprue piece (5) and has an ejector pin (10). The invention is characterized in that the injection gap (SP) between the feed orifice (6) of the sprue piece (5) and the information carrier disc blank (11) is less than 0.3 mm. In addition, the cutting gap (SN) between the edge of the impact cylinder (9) and the information carrier disc blank (11) is less than 0.2 mm.

13 Claims, 2 Drawing Sheets

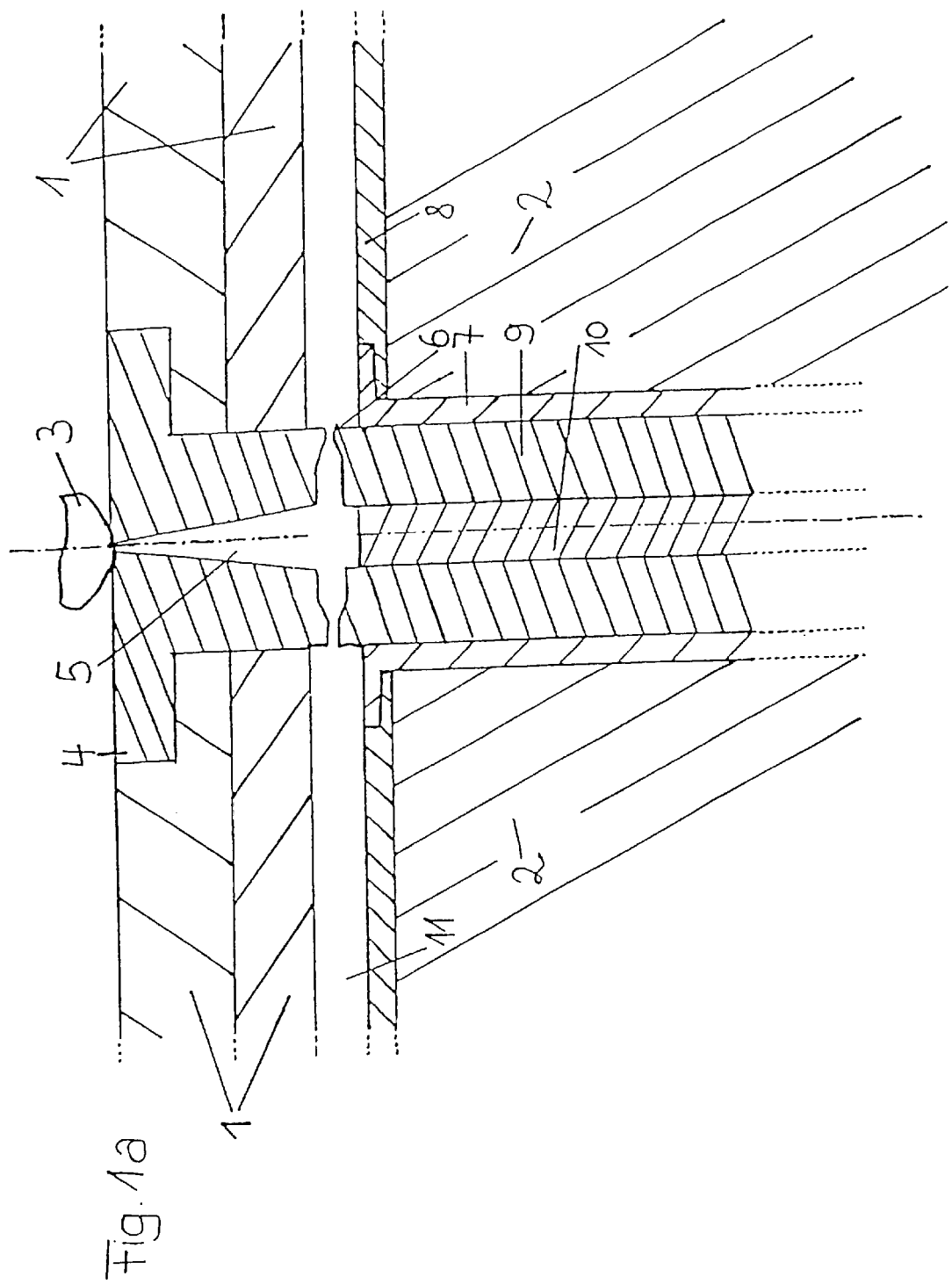

SHAPING TOOL FOR INFORMATION CARRIER DISC BLANKS

Figure 1B:
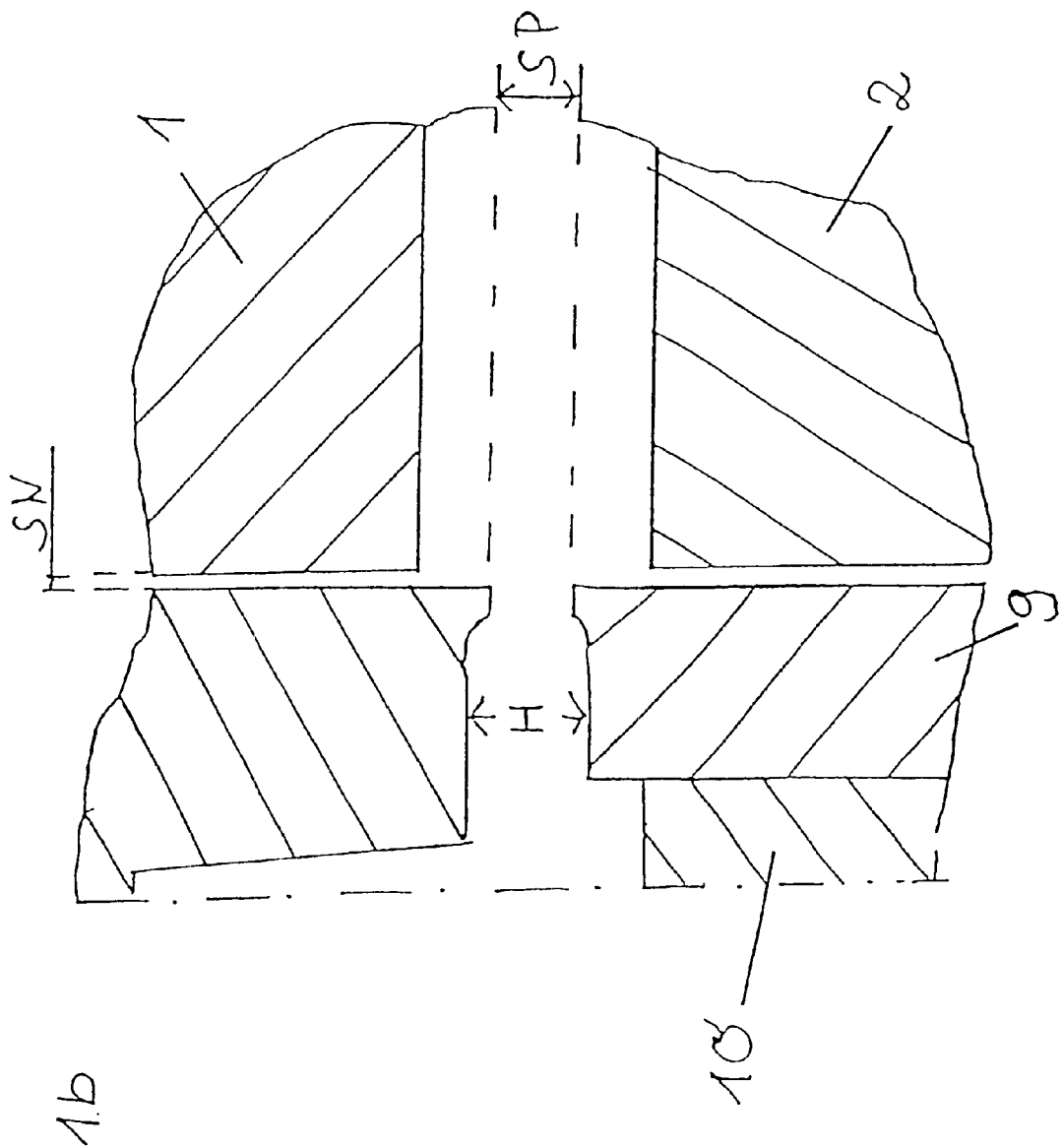

The invention relates to a mold apparatus for production of information-carrying disk blanks of polymethacrylate plastic by means of injection molding or compression molding, to a method for production of the information-carrying disk blanks and to the blanks and DVDs produced therefrom.

PRIOR ART

German Patent 3613334 C2 describes an injection mold for injection molding of information-carrying plates, especially compact disks, of polycarbonate or polymethyl methacrylate, the mold having two halves, wherein one half has a polished insert of zirconium oxide or silicon nitride in the region of the mold cavity. Detrimental influences such as accretions of dirt or deposition of moisture are prevented by this feature.

German Patent Application 19625717 A1 describes a method for cutting off the sprue of an injection-molded article, especially of an information-carrying disk, wherein the sprue is cut off outside the apparatus by means of a laser. In this way the sprue can be removed in particularly dust-free manner. The position of the disk-shaped sprue can then be freely chosen. In the case of location in the central region, advantageously no burrs are produced at the disk surface. Furthermore, the precise cutting edge of the laser permits an increase of the gate gap between sprue and mold part.

European Patent Application 551869 A1 describes a method and an injection-molding machine for production of information-carrying disks of thermoplastic plastic such as polycarbonate. In this case the plastic is first injected into the injection mold and then a movable cylinder is forced into the center of the injection molding, so that the resulting sprue piece remains joined to the disk only by a thin rim and can then be cut out with sufficient ease.

U.S. Pat. No. 5,330,693 also describes a method and an injection-molding machine for production of information-carrying disks from thermoplastic plastic. In this case it is important that a sufficient gap ranging from 0.2 to 0.9 mm, preferably 0.75 to 0.85 mm be left between the sprue piece and the disk, to ensure that the mold will be filled throughout its entire extent.

German Patent Application 3839536 A1 describes an injection-molding device for information-storage disks, in which the ejector device contains a compressed-gas channel. Polycarbonate and polymethyl methacrylate are cited as injection-molding materials. The problem of possible mold contamination by particulate dust during use of polymethyl methacrylate is not mentioned. Particulars of the dimensions of the injection gap or of the cutting gap are not provided.

OBJECT AND ACHIEVEMENT

Information-carrying disks of plastic are now produced predominantly of polycarbonate in injection-molding or compression-molding methods. A general problem therein is the relatively high tendency toward birefringence, which can easily occur, especially with polycarbonate, if processing is not optimal, especially in the case of thin layer thicknesses. During readout of information from the information-carrying disks—such as compact disks (CD), minidisks (MD) or digital versatile disks (DVD)—such birefringence leads to undesired interference and thus in the worst case to scrap loss.

Polymethacrylate plastics, or in other words plastics made predominantly from methyl methacrylate, exhibit less tendency to development of birefringence, and so the use of polymethacrylate plastics instead of polycarbonate certainly represents an interesting alternative. In addition to a larger processing window, polymethacrylate possesses the further advantage, compared with polycarbonate, of greater replication accuracy and surface hardness. A disadvantage, however, is greater brittleness. This causes problems in cutting off the sprue parts, since more particulate dust is formed and can get into the apparatus or onto the information-carrying disks themselves. Such particles can contaminate the injection mold or female dies, or in the worst case even make them unusable. Particulate dust on the information-carrying disks can lead to problems during subsequent processing steps, especially during metallization of the information-carrying side with an aluminum layer. This particulate dust leads to increased scrap loss and to an aluminum surface that is not closed.

It was regarded as an object to provide, for injection molding or compression molding of information-carrying disk blanks of polymethacrylate plastic, an apparatus which makes it possible to obtain information-carrying disk blanks with high replication accuracy and, while the sprue piece is still in the apparatus, to shear it off to such an extent that it can be easily cut off after removal of the blank. A particular objective was to prevent particle formation due to tearing out at the cutting-off point during the cutting-off process.

The object was achieved by a
mold apparatus, suitable as a component of an injection-molding or compression-molding machine, for injection molding or compression molding of information-carrying disk blanks (11) of polymethacrylate plastic, the mold apparatus comprising two mold parts (1, 2), wherein one mold part (1) contains a female die (8) with the information data and together with the second mold part (2) forms a cavity for the one information-carrying disk blank, a sprue bushing (4) for a sprue piece (5) with a centrally positioned gate (6), and an impact cylinder (9) for shearing the sprue piece (5) in the apparatus and an ejector pin (10) are also provided, characterized in that
the injection gap (SP) between the gate (6) of the sprue piece (5) and the information-carrying disk blank (11) is smaller than 0.3 mm and the cutting gap (SN) between the rim of the impact cylinder (9) and the information-carrying disk blank (11) is smaller than 0.2 mm.

The invention also relates to a method for production of an information-carrying disk blank of polymethacrylate plastic, as well as to the new information-carrying blank and DVDs produced therefrom.

By way of example, the invention will be explained by the following figures.

FIG. 1a:
Inventive mold apparatus in cross section. Mold part (1), in this case the upper part, is illustrated as composed of two pieces. Mold part (2) is illustrated as the lower part. Sprue piece (5) or the cavity therefor is configured according to Claim 2.

FIG. 1b:
Enlarged diagram of a segment of the cross section for illustration of the location of injection gap (SP) and cutting gap (SN).
(1)=Upper mold half
(2)=Lower mold half
(3)=Nozzle for injection of plasticized polymethacrylate plastic
(4)=Sprue bushing (5)=Sprue piece
(6)=Gate
(7)=Die-retaining bushing for holding the female die
(8)=Female die
(9)=Impact cylinder for shearing off the sprue piece
(10)=Ejector pin for ejecting the sprue piece
(11)=Information-carrying disk blank
(SP)=Injection gap
(SN)=Cutting gap
(H)=Height of the cavity in front of the injection gap Operation of the Invention The mold apparatus is, in a manner known in itself, a component of an injection-molding or compression-molding machine for production of information-carrying disk blanks.

In injection molding, the plasticized plastic is injected via a nozzle (3) under high pressure, such as $10^7$ to $10^8$ Pa (100 to 1000 bar) into the mold apparatus, the injection mold. In the process, female die (8) replicates the information data (pits) on the disk. After one of the two mold parts has been removed or swung up to open the mold apparatus, the cooled information-carrying disk blank can be removed therefrom, by means of a robot arm, for example, and then further processed.

In compression molding, the mold apparatus is still slightly open by about 0.5 to 0.7 mm at first after a specified quantity of plastic has been injected. Then the mold apparatus is closed by increasing the closing forces. The cooled information-carrying disk can then be removed as in injection molding. The compression-molding method usually leads to better replication accuracy than is achieved in the injection-molding method.

Corresponding injection-molding and compression-molding machines and methods are known and in some respects differ only by the software and/or hardware components used for control.

Readily flowing polymethacrylate molding compounds suitable for production of information-carrying disks are also known. They largely comprise polymerized methyl methacrylate, usually in proportions of at least 80 or 90 and especially at least 94 wt %, if necessary together with further (meth)acrylate compounds such as methyl acrylate. A suitable molding compound can comprise, for example 85 to 98, preferably 95 to 97 wt % of methyl methacrylate and 3 to 5 wt % of methyl acrylate, and can exhibit a solution viscosity in chloroform ranging from J=45 to 55 ml/g in chloroform at 23° C. The Vicat softening point according to ISO 306 B50 can range, for example, from 85 to 110° C., especially 100 to 110° C. The melt-flow index MFI according to ISO 1133 (230° C./3.8 kg) can be characterized by 5.0 to 30, preferably 5.5 to 6.5 ml/10 minutes.

Preferably, especially for production of DVDs, there is used a granulated polymethacrylate molding compound
comprising 85 to 97 wt % of methyl methacrylate and 15 to 3 wt % of methyl acrylate, ethyl acrylate or n-butyl acrylate
with a melt-flow index of 5.5 to 30 ml/10 minutes at 230° C./3.8 kg (ISO 1133)
thermal stability of at least 320° C. (TD value for 2% weight loss, measured in a thermal gravimetric analysis balance at a heating rate of 5° C./minute under nitrogen atmosphere)
a modulus of elasticity of 2800 to 3300 MPa (ISO 527) a fines proportion in the granules of less than 0.5, especially 0.3, especially preferably 0.1 wt %, determined by sieve analysis (1.6 mm mesh openings).

The material composition inherently leads to relatively low birefringence, especially by comparison with polycarbonate. The good melt-flow index favors good processability. High thermal stability prevents decomposition during processing. The fact that the modulus of elasticity is maintained is advantageous in particular for the thin DVDs, which have a thickness of only 0.6 mm. Since granules are used, the fines content is also of importance. The presence of particles of different size, especially relatively small particles, leads to the danger of inhomogeneities in the melting behavior of the polymethacrylate molding compound, to disturbances in the process as a result thereof and to reduced yields due to optical defects of the finished part. Experience shows that no problems are encountered when the fines content of the granules is smaller than 0.5 wt % (1.6 mm mesh openings).

Molding compounds available for injection molding almost always contain mold-release agents such as stearic acid, palmitic acid, cetyl alcohol, stearyl alcohol, oleic acid amide or technical mixtures of the said compounds. It has now been found that mold-release agent contained in polymethacrylate molding-compound granules can separate as fine droplets at the rims of mold parts (1, 2) of the mold apparatus, for example after several hours of continuous operation of the equipment. When the mold is opened, the droplets can then get onto either the female die or the blank itself. Naturally both are undesirable, especially during production of DVDs with extremely fine data structures, since they lead immediately to impairment of the female die or to scrap loss.

Surprisingly, this problem can be overcome by using polymethacrylate molding-compound granules containing at most 0.05 wt % of mold-release agent, or preferably none at all. It was not foreseeable that good replication accuracy would then be preserved almost without change even though the blank is necessarily somewhat more difficult to separate from the mold.

The mold apparatus comprises two mold parts (1, 2), wherein one mold part (1) contains a female die (8) with the information data (data structures =pits), said die being fastened to a die-retaining bushing (7), and together with the second mold part (2) forms a cavity for the one information-carrying disk blank, a sprue bushing (4) for a sprue piece (5) with a gate (6), and an impact cylinder (9) for shearing the sprue piece (5) in the apparatus and an ejector pin (10) are also provided.

The invention is based on the knowledge that, to avoid undesired particulate dust, it is necessary to take into consideration, in particular, not only the location and the dimensions of the gate (6), which are characterized by the injection gap (SP), but also the conditions during shearing of the sprue piece (5) by the impact cylinder (9), which are characterized by the cutting gap (SN).

The injection gap (SP) corresponds to the height of the gate (6).

The cutting gap (SN) is determined by the material tolerance between the impact cylinder (9) and the information-carrying disk blank (11), and corresponds to the distance between the inner rim of the information-carrying disk blank (11) and the outer rim of the impact cylinder (9) during the shearing process.

If the injection gap (SP) is too large, the problem arises that copious material is torn out, as it were, during shearing of the sprue piece (5), and so more particulate dust can be produced. If the gap is too small, the problem arises that the mold may not be filled adequately.

If the cutting gap (SN) is too small, "seizing" of the impact cylinder (9) and harmful material warping can occur. If the cutting gap (SN) is too large, the impact cylinder is no longer guided accurately. The material will be broken rather than sheared in the gate region, and more undesired particles will be formed.

The invention teaches that the injection gap (SP) between the gate (6) of the sprue piece (5), which gate must be centrally positioned, and the information-carrying disk blank (11) must be smaller than 0.3 mm, and preferably 0.15 to 0.25 mm in DVD production, and that simultaneously the cutting gap (SN) between the rim of the impact cylinder (9) and the information-carrying disk blank (11) must be smaller than 0.2 mm, preferably 0.02 to 0.12 mm. In this way it is possible to use polymethacrylate plastic for the information-carrying disk blank (11), without resulting in tearing out or particulate dust to a harmful extent during removal of the sprue piece (5).

It is particularly advantageous when the height (H) of the cavity for the sprue piece immediately in front of the injection gap (SP), at a distance of 1 to 2 mm, for example, between the gate (6) of the sprue piece (5) and the information-carrying disk blank (11) toward the center of the sprue piece (5) is again at least 0.5, preferably 0.6 to 1.2 mm. This almost bottle-shaped or stepped geometry of the sprue piece (5) permits a certain degree of guidance of the impact cylinder during the shearing process in the gap, and so the material is inherently stabilized during shearing.

In the inventive method, the polymethacrylate plastic in molten condition at 240 to 320° C., for example, preferably 260 to 300° C., is injected via a nozzle (3) at high pressure such as $10^7$ to $10^8$ Pa (100 to 1000 bar) through sprue bushing (4) into the apparatus. The polymethacrylate plastic spreads via sprue bushing (4) into sprue piece (5) and via gate (6) into the cavity for the information-carrying disk blank, thus replicating the information of female die (8), and solidifies in the mold apparatus at a temperature of about 40 to 80° C. Now sprue piece (5) is sheared off inside the apparatus, at gate (6), by means of impact cylinder (9), and sprue piece (5) is ejected by means of ejector pin (10). The finished information-carrying disk blank (11) can be removed after the apparatus has been opened.

The information-carrying disk blank can have, for example, the dimensions of a compact disk (CD; 1.2×120 mm), of a digital versatile disk (DVD; 2×0.6 mm×120 mm) or of a minidisk (MD; 1.2×64 mm), to mention only some of the possible data media. As examples, these media, which may be recorded or recordable data media, can be used for audio, video or computer software (ROM=read-only memory; CD-ROMs).

The specifications for DVDs are described in ECMA Standards 267 and 268. ECMA 267 specifies four DVD types—(read-only disks)—with storage capacities of 4.7 to 17.0 gigabytes. ECMA 268 specifies DVDs with 80 mm diameter. It is currently assumed that the ECMA specifications will be incorporated into ISO/IEC JTC1 standards.

The new information-carrying disk blank of polymethacrylate plastic has, due to removal of the gate, a roughened zone, which is disposed centrally at the rim of the hole and which can be felt and seen (if necessary using a magnifying glass or similar aid). It is characterized by extremely high accuracy of replication of the data structures (pits). It exhibits practically no perceptible birefringence, which is advantageous especially in DVDs, which are thin and have high data densities.

Information-carrying disk blanks of polymethacrylate plastic usually exhibit birefringence path differences of less than 50 nm, preferably 15 to 30 nm, especially 5 to 15 nm, the birefringence path difference fluctuating by not more than ±(plus or minus) 40%, preferably not more than ±30%, especially preferably not more than ±20% in a line following the radius from inside to outside.

The criterion used for accuracy of replication of the pit structures is the jitter value, which describes the fluctuation in the form of the standard deviations of the pit lengths from the standard value. For DVDs, Section 13.4.1 of ECMA 267 specifies jitter values of less than 8%. This value can be achieved by DVDs by means of the inventive method. A further measure of replication accuracy is the signal asymmetry according to ECMA 267, 13.2. DVDs must achieve a value of between −0.5 and at most 15.0 (15%), which is also easily possible with the inventive method (jitter and signal asymmetry values are measured on the DVD in finally assembled form, this DVD containing the information-carrying disk blank).

Digital versatile disks (DVDs) produced according to the invention are characterized by a jitter value of the replicated data according to ECMA Standard 267, 13.4.1, of less than 8.0%, and may at the same time, preferably, have a signal asymmetry according to ECMA Standard 267, 13.2, of less than 15%.

The planarity of the DVD is described by measurement of the radial and tangential angular deviation (tilt). By measurements on the DVD in finally assembled form, the angular deviation can be determined as the deflection from a reference plane both in the radial and tangential plane. Section 12.4 of ECMA 267 specifies a permissible radial tilt of at most ±0.8° and a permissible tangential tilt of at most ±0.3°. If the tilt is too large, the resulting deviation of the information plane from the reference plane causes problems—especially in a DVD with a plurality of information planes—in focussing the laser beam on the minute information unit (pits) and thus problems in readout of information on the different information planes of a DVD.

By the inventive method it is possible to produce DVDs which have a radial tilt (radial angular deviation) of not more than ±0.8°, preferably not more than ±0.7° and a tangential tilt (tangential angular deviation) of not more than ±0.3°, preferably not more than ±0.2°.

The information-carrying disk blank is provided as an essential component of finished CDs, DVDs or MDs. Further processing of the information-carrying disk blank, for example to a finished CD, DVD or MD or to another data-carrying disk, is accomplished in a manner known in itself. For a CD, the information-carrying side is coated with metal, for example by metallization with aluminum (sputtering). A lacquer layer, which can also contain printing, is applied for protection. DVDs are produced from two information-carrying disk blanks, which are bonded with an adhesive layer.

It has been further found that the stroke of the impact cylinder (9) also has an influence on particle formation at the stamped edge and—possibly as a consequence—on the breaking strength. A stroke in the range of 1.5 mm or greater is usually chosen for the production of information-carrying disks of polycarbonate.

If, in addition to the inventive setting of the injection gap (SP) and cutting gap (SN), the stroke of the impact cylinder is limited to 0.3 to 1.3 mm, preferably to 1.0 to 1.3 mm in CD production and to 0.3 to 1.0 mm, preferably to 0.4 to 0.6 mm in DVD production, particle formation at the central stamped hole will be further reduced.

The suspected reason for this result is that minute particles can be additionally torn out at the gate as the impact cylinder slides along, and that this action becomes more pronounced the longer such travel is. Obviously there are also formed thereby particles that are too small to be perceived with the naked eye. This is inferred from the fact that not only is mold contamination not observable initially but also no longer occurs after several hours of operation, provided the stroke of the impact cylinder is appropriately limited.

EXAMPLES

Injection-molding experiments on production of digital versatile disks (DVDs) with subsequent evaluation of the condition of the stamped edge in the central hole and of the breaking strength.

Experimental Setup/Injection-Molding Machine

An injection-molding machine with a two-piece mold apparatus having movable and stationary mold sides and female dies for DVDs was used.

The location of gate (6), injection gap (SP) and cutting gap (SN), and the stroke of the impact cylinder (stroke in mm), were each modified in the various experiments by installation of a different impact cylinder (9) and/or of a different sprue bushing (4).

A polycarbonate molding compound (PC) was used in some cases and two polymethacrylate molding compounds (PM-1 and PM-2) were used in other cases.

The molding compounds were each injected at a pressure of about 500 bar with an initial melt temperature of 290° C. and a mold temperature of 60° C. The cycle time for injection, holding pressure, cooling time, punching out the sprue, opening the mold and removal of the DVD was about 5 s. The experiments were evaluated on the basis of DVDs taken from the production process approximately 5 minutes after startup.

The stamped edge in the central hole (roughened zone, due to removal of the sprue piece by means of the impact cylinder) of the obtained DVDs was evaluated optically on the basis of criteria presented below. In the case of the gate located on one side, the top edge of the sprue closes together with the top edge of the DVD half side (in contrast to a centrally placed sprue).

Molding Compounds
PC
Commercial, low molecular weight polycarbonate molding compound (according to the manufacturer: intended for optical data media or suitable for DVD production)
PM-1
Composition: 92 wt % of methyl methacrylate, 8 wt % of methyl acrylate, MFI (ISO 1133, 230° C./3.8 kg)=21 g/10 min
J value=48 ml/g
PM-2
Composition: 96 wt % of methyl methacrylate, 4 wt % of methyl acrylate, MFI (ISO 1133, 230° C./3.8 kg)=6 g/10 min J value =52 ml/g Evaluation of the experimental results.

Stamped Edge

| | |
|---|---|
| 1 = very poor | rough with many tears, considerable particulate dust |
| 2 = poor | rough, hardly any tears, considerable particulate dust |
| 3 = moderate | little roughness, no tears, little particulate dust |
| 4 = good | hardly rough, particulate dust present |
| 5 = very good | smooth, no particulate dust observable |

The evaluation of breaking strength was tested by bending the DVDs by hand.

| | |
|---|---|
| 1 = very poor | breaks immediately |
| 2 = poor | somewhat better than 1 |
| 3 = moderate | breaks after further deflection |
| 4 = good | better bend radius than in 3 |
| 5 = very good | corresponds to the breaking strength of a polycarbonate DVD |

PM

Similar experimental results were always obtained with molding compounds PM-1 and PM-2. The experiments are therefore consolidated under "PM" in one column in the following table.

| Experiment No. | FM | SP mm | SN mm | Stroke mm | Location of the gate | Evaluation of the stamped edge | Evaluation of the bending behavior |
|---|---|---|---|---|---|---|---|
| 1 - DVD | PC | 0.3 | 0.7 | 1.5 | one side | 5 | 5 |
| 2 - DVD | PM | 0.3 | 0.7 | 1.5 | one side | 1 | 1 |
| 3 - DVD | PM | 0.3 | 0.5 | 1.5 | one side | 1 | 1 |
| 4 - DVD | PM | 0.3 | 0.2 | 1.5 | one side | 2 | 2 |
| 5 - DVD | PM | 0.3 | 0.2 | 1.5 | central | 2 | 3 |
| 6 - DVD | PM | 0.2 | 0.1 | 1.5 | one side | 3 | 2 |
| 7 - DVD | PM | 0.2 | 0.1 | 1.5 | central | 4 | 4 |
| 8 - DVD | PM | 0.2 | 0.1 | 0.5 | one side | 4 | 3 |
| 9 - DVD | PM | 0.2 | 0.1 | 0.5 | central | 5 | 4 |

In experiment 9, no mold contamination was found even after the injection-molding system had been operating continuously for several hours. In experiment 7, slight contamination developed after this time.

What is claimed is:

1. A mold apparatus, suitable as a component of an injection-molding or compression-molding machine, for injection molding or compression molding of information-carrying disk blanks of polymethacrylate plastic, the mold apparatus comprising two mold parts, wherein one mold part contains a female die with the information data and together with the second mold part forms a cavity for the one information-carrying disk blank, a sprue bushing for a sprue piece with a centrally positioned gate, and an impact cylinder for shearing the sprue piece in the apparatus and an ejector pin are also provided, wherein the injection gap between the gate of the sprue piece and the information-carrying disk blank is smaller than 0.3 mm and the cutting gap between the rim of the impact cylinder and the information-carrying disk blank is smaller than 0.2 mm, and wherein the stroke of the impact cylinder is 0.3 to 1.3 mm.

2. A mold apparatus according to claim 1, wherein the height of the cavity for the sprue piece immediately behind the injection gap between the gate of the sprue piece and the information-carrying disk blank toward the center of the sprue piece is at least 0.5 mm.

3. A method for production of DVD disk blanks of polymethacrylate plastic by injection molding or compression molding in an apparatus comprising two mold parts, wherein one mold part contains a female die with the information data and together with the second mold part forms a cavity for the one information-carrying disk blank, a sprue bushing for a sprue piece with a centrally positioned gate, and an impact cylinder for shearing the sprue piece in the apparatus and an ejector pin are also provided, wherein the injection gap between the gate of the sprue piece and the information-carrying disk blank is smaller than 0.3 mm and the cutting gap between the rim of the impact cylinder and the information-carrying disk blank is smaller than 0.2 mm, in which method the polymethacrylate plastic in molten condition is injected via a nozzle at high pressure through the sprue bushing into the apparatus, the polymethacrylate plastic solidifies in the apparatus, the sprue piece is sheared off inside the apparatus, at gate, by means of the impact cylinder, the sprue piece is ejected by means of the ejector pin, and the information-carrying disk blank is removed after the apparatus has been opened.

4. A method for production of information-carrying disk blanks of polymethacrylate plastic by injection molding or compression molding in an apparatus comprising two mold parts, wherein one mold part contains a female die with the information data and together with the second mold part forms a cavity for the one information-carrying disk blank, a sprue bushing for a sprue piece with a centrally positioned gate, and an impact cylinder for shearing the sprue piece in the apparatus and an ejector pin are also provided, wherein the injection gap between the gate of the sprue piece and the information-carrying disk blank is smaller than 0.3 mm and the cutting gap between the rim of the impact cylinder and the information-carrying disk blank is smaller than 0.2 mm, in which method the polymethacrylate plastic in molten condition is injected via a nozzle at high pressure through the sprue bushing into the apparatus, the polymethacrylate plastic solidifies in the apparatus, the sprue piece is sheared off inside the apparatus, at gate, by means of the impact cylinder, the sprue piece is ejected by means of the ejector pin, and the information-carrying disk blank is removed after the apparatus has been opened, wherein the polymethacrylate plastic is used in the form of a granulated polymethacrylate molding compound comprising 85 to 97 wt % of methyl methacrylate and 15 to 3 wt % of methyl acrylate, ethyl acrylate or n-butyl acrylate with a melt-flow index of 5.5 to 30 ml/10 minutes at 230° C./3.8 kg (ISO 1133)

thermal stability of at least 320° C. (TD value for 2% weight loss, measured in a thermal gravimetric analysis balance at a heating rate of 5° C./minute under nitrogen atmosphere)

a modulus of elasticity of 2800 to 3300 MPa (ISO 527)

a fines proportion in the granules of less than 0.5 wt %, determined by sieve analysis (1.6 mm mesh openings).

5. A method according to claim 4, wherein the granulated polymethacrylate molding compound contains no mold-release agent or not more than 0.05 wt % of such an agent.

6. An information-carrying disk blank of polymethacrylate plastic, obtainable in a method for production of information-carrying disk blanks of polymethacrylate plastic by injection molding or compression molding in an apparatus comprising two mold parts, wherein one mold part contains a female die with the information data and together with the second mold part forms a cavity for the one information-carrying disk blank, a sprue bushing for a sprue piece with a centrally positioned gate, and an impact cylinder for shearing the sprue piece in the apparatus and an ejector pin are also provided, wherein the injection gap between the gate of the sprue piece and the information-carrying disk blank is smaller than 0.3 mm and the cutting gap between the rim of the impact cylinder and the information-carrying disk blank is smaller than 0.2 mm, in which method the polymethacrylate plastic in molten condition is injected via a nozzle at high pressure through the sprue bushing into the apparatus, the polymethacrylate plastic solidifies in the apparatus, the sprue piece is sheared off inside the apparatus, at gate, by means of the impact cylinder, the sprue piece is ejected by means of the ejector pin, and the information-carrying disk blank is removed after the apparatus has been opened, wherein a roughened zone due to removal of the gate is disposed centrally at the rim of the hole of the information-carrying disk.

7. An information-carrying disk blank according to claim 6, wherein it is a component of a recorded or recordable optical data medium.

8. An information-carrying disk blank according to claim 7, wherein it is a component of a compact disk (CD), of a digital versatile disk (DVD) or of a minidisk (MD).

9. An information-carrying disk blank according to claim 10, wherein it is a component of a digital versatile disk (DVD) and the DVD produced therefrom has a jitter value of the replicated data according to ECMA Standard 267, 13.4.1, of less than 8.0%.

10. An information-carrying disk blank according to claim 9, wherein the signal asymmetry according to ECMA Standard 267, 13.2, is less than 15%.

11. A digital versatile disk (DVD), which can be produced by a method for production of information-carrying disk blanks of polymethacrylate plastic by injection molding or compression molding in an apparatus comprising two mold parts, wherein one mold part contains a female die with the information data and together with the second mold part forms a cavity for the one information-carrying disk blank, a sprue bushing for a sprue piece with a centrally positioned gate, and an impact cylinder for shearing the sprue piece in the apparatus and an ejector pin are also provided, wherein the injection gap between the gate of the sprue piece and the information-carrying disk blank is smaller than 0.3 mm and the cutting gap between the rim of the impact cylinder and the information-carrying disk blank is smaller than 0.2 mm, in which method the polymethacrylate plastic in molten condition is injected via a nozzle at high pressure through the sprue bushing into the apparatus, the polymethacrylate plastic solidifies in the apparatus, the sprue piece is sheared off inside the apparatus, at gate, by means of the impact cylinder, the sprue piece is ejected by means of the ejector pin, and the information-carrying disk blank is removed after the apparatus has been opened, wherein a jitter value of the replicated data according to ECMA Standard 267, 13.4.1, of less than 8.0%.

12. A digital versatile disk (DVD) according to claim 11, wherein the signal asymmetry according to ECMA Standard 267, 13.2, is less than 15%.

13. A digital versatile disk (DVD) according to claim 11, characterized by a radial tilt (radial angular deviation) of not more than ±0.8°, and a tangential tilt (tangential angular deviation) of not more than ±0.3°.

* * * * *